United States Patent Office 3,836,491
Patented Sept. 17, 1974

3,836,491
NOVEL COMPOSITIONS COMPRISING POLYISO-
CYANATES AND HYDROXYBENZOIC ACID
CAPPED POLYMERS CURABLE WITH TERTIARY
AMINES AND PROCESS OF CURING SAME
David D. Taft, Minneapolis, and Roger A. Schmidt,
Burnesville, Minn., assignors to Ashland Oil Inc., Houston, Tex.
No Drawing. Continuation of abandoned application Ser.
No. 109,985, Jan. 26, 1971. This application Jan. 31,
1973, Ser. No. 328,161
The portion of the term of the patent subsequent to
Jan. 29, 1990, has been disclaimed
Int. Cl. C08g 33/10
U.S. Cl. 260—22 TN                                   21 Claims

ABSTRACT OF THE DISCLOSURE

A novel and improved composition formed by crosslinking an hydroxybenzoic acid capped prepolymer with a polyisocyanate in the presence of a tertiary amine, said composition being rapidly curable to essentially its desired final state at room temperature.

---

This is a continuation of application Ser. No. 109,985, filed Jan. 26, 1971, now abandoned.

Field of the Invention

This invention relates generally to novel compositions of improved properties which are rapidly curable at room temperature. The compositions are based on the combination of (1) prepolymers which have been selectively capped with an hydroxybenzoic acid, (2) a polyisocyanate and (3) a tertiary amine.

BACKGROUND OF THE INVENTION

It has been known, heretofore, that isocyanates react with phenolic resins to result in crosslinked materials. Heating has been generally employed to cause the isocyanate to react with the phenolic resin, either through the phenolic hydroxy group or through the methylol group in order to achieve the formation of crosslinking urethane linkages. It has been known also to react isocyanates with polyepoxides and polyesters to result in crosslinked materials, or in chain-extended materials that can subsequently be crosslinked with excess isocyanate. These reactions, too, generally require heating to effect the desired crosslinking. There have been disclosed in the prior art certain compositions formed from polyisocyanate-resin mixtures which can be crosslinked or cured at room temperature. Of those prior art compositions that can be cured at room temperature, unusually long curing times are required.

The present invention relates to the production of novel compositions. More particularly, this invention relates to products prepared by curing a composition, which is a combination of a phenolic functional material and a polyisocyanate, in the presence of a tertiary amine. Specifically, this invention relates to improvements in such compositions enabling its use in diversified coating, binder, and other applications.

In the coating art, for example, typically, a coating composition is prepared in an organic or aqueous solvent; is applied to a surface; and the solvent is allowed to evaporate. Normally the composition requires heating and/or prolonged air drying in order to cure or harden the coating by solvent evaporation, oxidation or chemical curing. A variety of such coating systems such as varnishes and baking alkyds are known. Reduction in the period of time required to cure coatings and elimination of a heat treatment, particularly where the materials to be coated are heat sensitive, is particularly desirable.

Curable compositions based on polyisocyanates and a variety of active hydrogen-containing materials such as phenolic resins are known. The problems encountered when adapting such systems to coating, binder and other applications include those mentioned above; namely, that heating or curing for extended periods of time is required to give a properly cured and useful coating. On the other hand, where the system is catalyzed for a quick cure, problems arise with respect to, among others, the pot life of the composition.

In U.S. Pat. 3,409,579, issued Nov. 4, 1968, there are disclosed certain polyisocyanate-phenolic resin compositions which can be cured with amines and which may be useful as coatings. It has now been found that certain of these combinations of polyisocyanate and phenolic resin compositions, useful as binders for foundry core applications by virtue of their superior adhesion and tensile strength when applied to sand and the like, are not entirely suitable for certain coating as well as other applications because their color and color retention properties, flexibility and caustic resistance are not suitable for applications where durability, flexibility and resistance are highly desirable properties. The problems noted with many polyisocyanate-phenolic combinations is that initially the color of the composition is slightly off-white to significantly yellow and that the color characteristics are affected by aging, particularly under ultraviolet light conditions. Furthermore, these systems have inferior durability over extended periods of time. Such combinations would not be suitable in applications where clear and colorless coatings, for example, are desired or where the coatings are pigmented with a white or other light colored pigment and whose appearance would be adversely affected by the initial yellowing or the yellowing upon aging of the binder or vehicle. Also, pot life of the compositions, although adequate for foundry applications, is not entirely satisfactory for coating applications.

For the most part, these aforementioned polyisocyanate and phenolic resin combinations have inadequate solvent and caustic resistance for some coating or other applications where such resistance is a highly desirable property. Moreover, these prior art materials have poor flexibility when the composition, as applied, must exhibit flexibility in its ultimate use (such as coatings or flexible binders).

The problems in the prior art discussed above are effectively overcome by selectively capping an hydroxy-containing prepolymer with an hydroxybenzoic acid and curing the capped, hydroxy-containing prepolymer to essentially its final state with a polyisocyanate in the presence of a tertiary amine. In addition to the improved properties already discussed, the composition of the instant invention has improved flexibility over the compositions of U.S. Pat. 3,409,579. In some cases, higher solids application systems are achieved by using compositions described in the instant invention as compared to those compositions of the earlier patent.

Thus, the compositions of this invention exhibit improved color and color retention, weatherability, caustic resistance and flexibility as compared to certain prior art compositions. In addition, the compositions of the instant invention are rapidly curable at room temperature.

Objects of the Invention

Thus, it is an object of the present invention to provide improved quality multi-purpose compositions and a method for curing such compositions.

It is an additional object of the present invention to provide novel compositions which are rapidly curable to essentially their final state at room temperature and which have good pot life.

It is another object of the present invention to provide coating and binder compositions of improved color and weathering characteristics which are suitable for, among other uses, paints and varnishes but do not adversely affect the color of such materials.

Still another object is to provide improved compositions having excellent moisture resistance, caustic resistance, improved weatherability, improved flexibility and good adhesion to a variety of substrates.

A further object of the present invention is to provide a novel for curing the improved compositions without the application of heat.

Still other objects of the present invention will become apparent from the description of the invention and the claims that follow.

Description of the Invention

Broadly, the present invention relates to compositions comprising the combination of hydroxybenzoic acid capped hydroxy-containing materials with sufficient polyisocyanate to crosslink the hydroxybenzoic acid capped materials. The compositions are intended in one embodiment of the invention to be coated on a substrate and cured with a tertiary amine.

According to the present invention, novel compositions are provided which cure at room temperature. The novel compositions of the present invention are generally made available as a composition comprising a hydroxybenzoic acid capped hydroxy- containing polymer component and a polyisocyanate. These compositions can be stabilized optionally with acid or the like and may contain optionally an appropriate amount of organic solvent and other additives such as pigments, plasticizers, etc. At the time of use, the composition is applied by conventional means, i.e. brushing, spraying, or rolling, and is brought together with a tertary amine. In a brief period of time, within seconds or minutes, the product of this invention has cured to a desired state more rapidly than the compositions of the prior art and/or exhibits improved properties over the prior art. When used as a coating composition, the product of this invention cures to a tack-free state within seconds or minutes and is hard enough to withstand handling without deformation or smearing of the coating. Furthermore, when so applied, products coated with the novel compositions of this invention and cured according to the method of this invention are durable enough to withstand the handling required for boxing, shipping, etc., within anywhere from 10 minutes to 4 hours. This time for safe handling is determined by the exact component makeup of the composition and the type of film properties desired in the ultimate coated product. In most cases, the compositions of this invention, when applied as coatings, exhibit about 50 to about 65% of their final film properties 15 minutes after exposure to a tertiary amine for 15 seconds. In other cases, these same film properties are reached within as little as 2-3 minutes after exposure to a tertiary amine for 15 seconds.

For the purposes of clarity and definition, the phrase "hydroxybenzoic acid capped hydroxy-containing polymer" is intended to define the reaction product of a hydroxybenzoic acid and hydroxy-containing prepolymers regardless of whether or not the ultimate reaction product contains any unreacted free hydroxy groups. The presence or absence of the free hydroxy groups in the ultimate product is determined by the amount of hydroxybenzoic acid reacted with the hydroxy-containing prepolymer. From this point throughout the disclosure, the term "hydroxybenzoic acid capped hydroxy-containing polymer" is inclusive of all products of the reaction of a hydroxybenzoic acid and a hydroxy-containing prepolymer.

In U.S. Pat. 3,409,579, it is disclosed that certain phenolic resin-polyisocyanate mixtures may be used as coating compositions and cured at room temperature.

The preferred phenolic resins are condensation products of a phenol having the general formula:

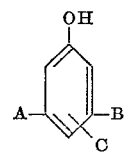

wherein A, B and C are hydrogen, hydrocarbon radicals, oxyhydrocarbon radicals or halogen. The condensation product of a phenol of the aforementioned structure with an aldehyde having the general formula R′CHO wherein R′ is a hydrogen or a hydrocarbon radical of 1 to 8 carbon atoms is prepared in the liquid phase under substantially anhydrous conditions at temperatures below about 130° C. in the presence of catalytic concentrations, of a metal ion dissolved in the reaction medium. The preparation and characterization of these resins is disclosed in greater detail in U.S. Pat. 3,485,797 issued Dec. 23, 1969. These resins have the general formula:

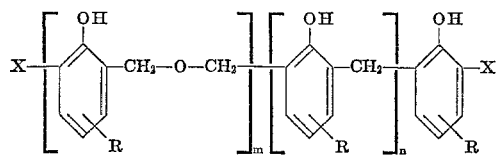

where R is a hydrogen or a phenolic substituent meta to the phenolic hydroxy group, the sum of $m$ and $n$ is at least 2 and the ratio of $m$-to-$n$ is at least 1, and X is an end-group consisting of hydrogen or a methylol group, the molar ratio of said methylol-to-hydrogen end-groups being at least 1.

In such a phenolic resin structure or other phenolic resins which can be employed in the above patent, a high crosslink density is achieved on curing with a polyisocyanate. This often leads to excessive solvent entrapment during curing and to inexible films once curing has occurred. Furthermore, because of the close proximity of the phenolic groups in the composition disclosed in the above Patent, some of the groups are left unreacted after curing. These phenolic groups are subject to ionization in the presence of an alkali or caustic and as a result are more susceptible to caustic degradation. For many coating as well as other applications where a high degree of flexibility and resistance is desired in the cured product, the use of such phenolic resins cured with polyisocyanates is not desirable. Also, these phenolic resin compositions on exposure to ultraviolet and other weathering conditions often degrade leading to excessive chalking and yellowing of the coating. This is true of the known and conventional phenolic resins such as the novalaks, resoles, resitoles and resites, when cured with the polyisocyanate in the presence of a tertiary amine.

This invention makes it possible to provide compositions which are flexible and which rapidly cure to give durable weathering properties. The compositions of this invention also exhibit improved caustic resistance, color-retention properties, etc., thus overcoming a number of deficiencies in the compositions of the prior art. These compositions can be coated on a variety of substrates such as paper, textile, metal, glass, and wood in typical coating applications to give superior rapid-cure coatings.

The hydroxybenzoic acid capped hydroxy-containing polymers employed in this invention are obtained by first forming a prepolymer with excess hydroxy groups. These prepolymers can be prepared, for example, by reacting a polyhydric alcohol with propylene or ethylene oxide to give polyoxyalkylene containing polyols whose functionality is dependent upon the concentration of alkylene oxide and polyhydric alcohol. Thus, for example, trimethylol propane can be reacted with propylene oxide to yield a polypropylene glycol ether which has a functionality of 3 and a molecular weight determined by the number of moles of propylene oxide which have reacted with the trimethylol propane. In a similar fashion, lactones can be polymerized in the presence of a polyhydric alcohol to prepare a polyester whose functionality is determined by the functionality of the initial polyhydric alcohol. Thus, ε-caprolactone can be reacted with pentaerythritol, trimethylol propane (TMP), ethylene glycol, and the like to form hydroxy-containing prepolymers for subsequent reaction with hydroxybenzoic acids. Likewise, polyhydric alcohols can be reacted with polybasic acid to form hydroxy terminated polyesters which can be employed as the hydroxy-containing components for subsequent reaction with hydroxybenzoic acids. In a similar manner, tetrahydrofuran can be polymerized to form a polytetramethylene glycol polyether which can be subsequently reacted with the hydroxybenzoic acids. Also, an excess of equivalents of a polyhydric alcohol can be reacted with a diisocyanate to obtain polyhydroxy components which can be reacted with an hydroxybenzoic acid.

These polyhydroxy prepolymers are then reacted with up to a stoichiometric amount of an hydroxybenzoic acid. If less than a stoichiometric amount is employed, a polymer will be formed which, in addition to free phenolic groups, contains free hydroxy groups available for reaction with a polyisocyanate. The reaction between the hydroxybenzoic acid and the hydroxy-containing prepolymer is believed to be represented by the following:

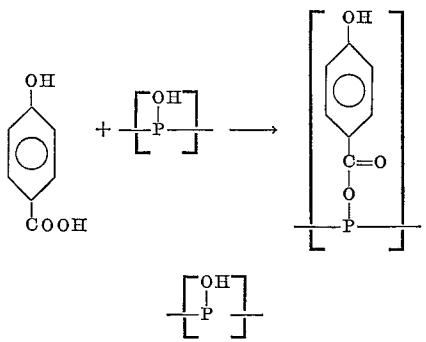

where $$\begin{bmatrix} \text{OH} \\ | \\ \text{P} \end{bmatrix}$$

represents the hydroxy-containing prepolymer. The amount of hydroxybenzoic acid preferably reacted with the hydroxy-containing prepolymer contemplated by this invention is from 20–100% based on the reactive hydroxy content of the hydroxy-containing prepolymer. The more preferred amount is from 60–100% based on the said reactive hydroxy content.

Suitable hydroxybenzoic acids include para, meta and ortho hydroxybenzoic acids or their $C_1$–$C_4$ alkyl esters. Hereinafter the term "hydroxybenzoic acid" is intended to include the $C_1$–$C_4$ alkyl esters of the hydroxybenzoic acid. A general representation for these hydroxybenzoic acids has the following structure:

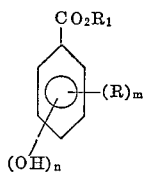

wherein $R_1$ may be hydrogen or a $C_1$–$C_4$ alkyl group; R may be hydrogen, a $C_1$–$C_8$ alkyl group or an aromatic substituent; $n+m$ cannot be greater than 5; and $n$ must be at least 1. Preferably R is equal to H and $n$ is equal to 1. The preferred hydroxybenzoic acids are para or meta hydroxybenzoic acid, their methyl or ethyl esters, or mixtures thereof. Ortho hydroxybenzoic acid is preferred especially as its methyl ester form known as methyl salicylate or oil of wintergreen. The hydroxybenzoic acid is reacted with the hydroxy-containing prepolymer. In the case of the esters, the hydroxybenzoic acid esters are transesterified with the hydroxy-containing prepolymer. There are thus obtained hydroxybenzoic acid esters of polyhydroxy prepolymers which contain free phenolic hydroxy groups on the prepolymer backbone. These phenolic OH groups are attached to the hydroxy-containing prepolymer by way of esterification of the hydroxy group on the prepolymer with the acid group of the hydroxybenzoic acid as is shown above. This attachment procedure we have defined as "capping."

The transesterification reaction of the hydroxybenzoic acid ester with the hydroxy-containing prepolymer is conducted at elevated temperature in the range of from about 325° F. to about 500° F. in the presence of a transesterification catalyst such as dibutyltin oxide or tetraisopropyl titanate. Where the reaction catalyst is omitted, the reaction temperatures must be increased. Where the hydroxybenzoic acid per se is reacted with the hydroxy-containing prepolymer, the direct esterification reaction time will be slower and/or the reaction temperature will be higher, even in the presence of an esterification catalyst such as paratoluenesulfonic acid. This difference in reaction time and/or temperature is due to the fact that the direct esterification reaction is a more difficult reaction to conduct than is the transesterification reaction of a methyl or ethyl ester, e.g.

Because of the wide range of polyhydroxy prepolymer components which can be employed for subsequent reaction with hydroxybenzoic acids, a wide variety of hydroxybenzoic acid capped hydroxy-containing polymers are made available for crosslinking with polyisocyanates in the presence of a tertiary amine. The preferred hydroxy-containing prepolymers are the polycaprolactones, obtained by the reaction of ε-caprolactone with polyhydric alcohols, and polyhydroxy polyesters prepared by the reaction of polyhydric alcohols with polybasic acids, which may optionally contain non-hydroxy monocarboxylic acids. In the case of the polyhydroxy polyesters, the preferred polybasic acids are the aromatic dicarboxylic acids, such as isophthalic, orthophthalic, terephthalic acids and their anhydrides, where the formation of the anhydride is possible; the aliphatic dicarboxylic acids, such as adipic, sebacic and azelaic acids; trimellitic anhydride; or mixtures thereof. Preferred polyhydric alcohols are TMP (trimethylol propane), TME (trimethylol ethane), pentaerythritol, ethylene glycol, propylene glycol, hexanediol, butanediol, glycerin, hexanetriol, neopentyl glycol and the like and mixtures thereof. These polyesters, optionally, can be modified with non-hydroxy monocarboxylic acids to provide different physical properties. Suitable non-hydroxy monocarboxylic acids are benzoic, paratertiary butyl benzoic, aliphatic carboxylic acids such as 2-ethylhexoic acid, or fatty acids derived from naturally occurring oils such as tall oil, soybean oil, castor oil, and the like. The preferred polyhydroxy polyester compositions are based on the reaction of polybasic acids selected from adipic acid, isophthalic acid and phthalic anhydride with polyhydric alcohols selected from TMP, TME, hexanediol, propylene glycol and neopentyl glycol.

Another hydroxy-containing prepolymer can be prepared by reacting acrylic monomers with copolymerizable hydroxy monomers.

These hydroxy-containing prepolymers are then modified as previously discussed with the hydroxybenzoic acids for curing with a polyisocyanate in the presence of a tertiary amine.

The hydroxybenzoic acid reaction product with the hydroxy-containing prepolymer is one component of the novel composition of this invention. The other component is a hardener component comprising a polyisocyanate. The polyisocyanate can be an aliphatic, cycloaliphatic, or aromatic polyisocyanate having preferably 2–5 isocyanate groups or a polyisocyanurate made thereof. If desired, mixtures of polyisocyanates can be employed. Also contemplated for use in this invention are isocyanate polymers formed by reacting, in equivalent excess, any of the above polyisocyanates with a hydroxy-containing prepolymer such as those described previously (i.e., adipic acid-propylene glycol-TMP polyester), or with a polyhydric alcohol.

Thus, a prepolymer of toluene diisocyanate and ethylene glycol or TMP can be employed successfully in this invention. Suitable polyisocyanates include the aliphatic polyisocyanates such as hexamethylene diisocyanate, alicyclic polyisoyanates such as 4,4'-dicyclohexylmethane diisocyanate, and aromatic polyisocyanates such as 2,4- and 2,6-toluene diisocyanate (TDI), diphenylmethane diisocyanate, and the dimethyl derivatives thereof. Further examples of suitable polyisocyanates are trimethyl hexamethylene diisocyanate, lysine diisocyanate methyl ester (LDIM), alicyclic polyisocyanates such as isophorone diisocyanate, methyl cyclohexyl diisocyanate, 1,4-naphthalene diisocyanate, triphenylmethane triisocyanate, and xylylene diisocyanate, and the methyl derivatives thereof, polymethylenepolyphenyl isocyanates, chlorophenylene-2,4-diisocyanate, and the like. Although all polyisocyanates react with the compositions of this invention to form a crosslinked polymer structure, certain polyisocyanates are preferred. Generally speaking, the fastest curing time is obtained when aromatic polyisocyanates are used in the invention. Aliphatic and polymeric polyisocyanates, while also yielding rapid cure in the presence of a tertiary amine, give somewhat slower cures than the aromatic polyisocyanates. The preferred polyisocyanate component is determined by the intended application of the composition. Where, for example, a colorless coating composition is desired, the choice of polyisocyanate should be such as not to impart undesirable color to the composition.

It has been found that the choice of polyisocyanate affects not only the original color of the coating but also the color after aging under conditions such as ultraviolet exposure. Among the preferred polyisocyanates are a reaction product of hexamethylene diisocyanates and toluene diisocyanate known and sold under the name Mondur HC; a TDI-TMP adduct known and sold under the name Mondur CB-60; aliphatic or aromatic polyisocyanate adducts of polycaprolactones, polypropylene glycol ethers, or polyesters derived from polybasic acids and polyhydric alcohols; polymethylene polyphenyl isocyanates, known and sold under the name Mondur MR or Mondur MRS; TDI isocyanate trimer; and the biurets, which are the reaction product of a polyisocyanate with water. One such biuret is known and sold under the name Desmodur N.

Of these polyisocyanate materials, those found to exhibit superior color properties are Mondur HC; polyisocyanates based on xylylene diisocyanate, such as a xylylene diisocyanate-TMP adduct; and Desmodur N.

The polyisocyanate is employed in sufficient concentrations to cause essentially complete curing of the hydroxybenzoic acid capped hydroxy-containing polymer compositions. In general, the polyisocyanate or a polyisocyanate polymer will be employed in a range of about 10 to about 1000 weight percent of polyisocyanate based on the weight of the hydroxy-containing prepolymer which has been reacted with a hydroxybenzoic acid. Preferably, from about 20 to about 300% by weight on the above basis is employed. This amount is dependent upon the amount of NCO groups in the polyisocyanate or the polyisocyanate-containing polmer. The polyisocyanate is preferably employed in liquid form. These liquid polyisocyanates can be employed in undiluted form. Furthermore, solid or viscous polyisocyanates may be employed in the form of organic solvent solutions, the solvent being present in a range of up to about 80% by weight of the solution.

The hydroxybenzoic acid capped hydroxy-containing polymer component of the composition is preferably employed as a solution in an organic solvent, although the use of a solvent is not necessary in all cases. The nature and the effect of this solvent will be more specifically described below. The amount of solvent, if necessary, used should be sufficient to permit uniform application of these compositions. The specific solvent concentrations for the hydroxybenzoic acid capped hydroxy-containing polymers will vary depending on the type of hydroxy-containing prepolymer and hydroxybenzoic acid employed and the molecular weight of the hydroxybenzoic acid capped hydroxy-containing polymer component. In general, the solvent concentration will be in the range of up to 80% by weight based on the capped hydroxy-containing polymer solution and preferably in the range of 5–80%.

The solvent employed in combination with either the hydroxybenzoic acid capped component or the polyisocyanate component or both components does not enter to any significant degree into the reaction. In some cases, the difference in the polarity between the polyisocyanate and the hydroxybenzoic acid capped polymer component restricts the choice of solvents in which both components are compatible. Such compatibility is necessary to achieve reaction and essentially complete curing of the novel compositions of the present invention. Where the hydroxybenzoic acid capped hydroxy-containing polymer composition and the polyisocyanate are compatible, no solvent is necessary and rapid room temperature cure of such mixtures can be effected in the presence of a tertiary amine. The solvent, if present, aids in the uniform distribution of the blend of ingredients on the substrate. Aromatic solvents, although compatible with the polyisocyanates, are less compatible with the hydroxy-containing prepolymers capped with hydroxybenzoic acids. It is therefore preferred to employ combinations of solvents and particularly combinations or aromatic and polar solvents. Suitable aromatic solvents are benzene, toluene, xylene, ethyl benzene, naphthalene, and mixtures thereof. The polar solvents should not be extremely polar such as to become incompatible with the aromatic solvent. Suitable solvents which are compatible with aromatic solvents include, in particular, ester, ketone, and ether solvents. These solvents should preferably not contain active hydrogen moieties reactive with the polyisocyanate. Preferred solvents include the esters of glycol ethers, such as ethylene glycol monoethyl ether acetate (known and sold under the name Cellosolve acetate), ethylene glycol monobutyl ether acetate (known and sold under the name butyl Cellosolve acetate), diethylene glycol monobutyl ether acetate (known and sold under the name butyl Carbitol acetate); ketone solvents, such as methyl isobutyl ketone and methyl heptyl ketone; butyl and ethyl acetate; and furfural.

It has also been found that the pot life of the blend of the polyisocyanate and the hydroxybenzoic acid capped hydroxy-containing polymer in a solvent or, where the two components are compatible, as a liquid blend with no solvent present, can be significantly improved without adversely affecting the rapid curing and finished film properties of the component blends. Pot life as used herein is defined as the time at which the polymer blend can no longer be applied under normal application conditions. The pot life improvement is attained by the addition of an effective amount of either mineral or strong organic acids or acid halides. Acids which are useful include hydrochloric, phosphoric, trichloroacetic, benzene sulfonic acids and the like. Phthaloyl chloride is particularly effective as an additive to improve the pot life of these blends. These acids or acid halides are used in concentrations up to 3 percent based on the non-volatile content of the blend.

When the components described with particularity above are mixed and formed into, for example, a coating film, they can be rapidly and essentially completely cured to a tack-free state at room temperature in the presence of tertiary amines. These amines can be in a liquid or gaseous state. If the tertiary amine is in a liquid form, it can be admixed with the hydroxybenzoic acid capped hydroxy-containing polymer component. The polyisocyanate component can be added to this admixture just prior to application of the hydroxybenzoic acid capped hydroxy-containing polymer component to the surface or substrate, as in the case of a two-head spray gun application, or simultaneous with the application of the said capped hydroxy-containing component to a surface or substrate, as in a roller coating application. Essentially complete curing occurs very rapidly at room temperature. When the tertiary amine is in a gaseous form or atomized in an inert carrier gas, an admixture of the hydroxybenzoic acid capped hydroxy-containing polymer component and the polyisocyanate, in the form of a film, can be rapidly cured simply by exposure of the film surface to the tertiary amine atmosphere. Suitable tertiary amines are gaseous tertiary amines such as trimethyl amine. However, normally liquid tertiary amines such as triethyl amine, ethyl dimethyl amine, and methyl diethyl amine are equally suitable. Although ammonia, primary amines and secondary amines exhibit some minor activity in causing a room temperature reaction, they are considerably inferior to the tertiary amines because they react with the polyisocyanate component. Functionally substituted amines, such as dimethyl ethanol amine, are included within the scope of tertiary amines and can be employed as curing agents. Functional groups which do not interfere in the action of the tertiary amine are hydroxy groups, alkoxy groups, amino and alkyl amino groups, ketoxy groups, thio groups, and the like. It is believed and only speculated for purposes of explanation that in the curing mechanism, the tertiary amine acts in such a manner as to convert the available phenolic hydroxy moieties of the hydroxybenzoic acid capped hydroxy-containing polymer component from their condition of being weakly acidic into a relatively strong basic reactivity to facilitate the reaction of the aforesaid moieties with the polyisocyanate. This mechanism is believed to be exemplified by the following equation:

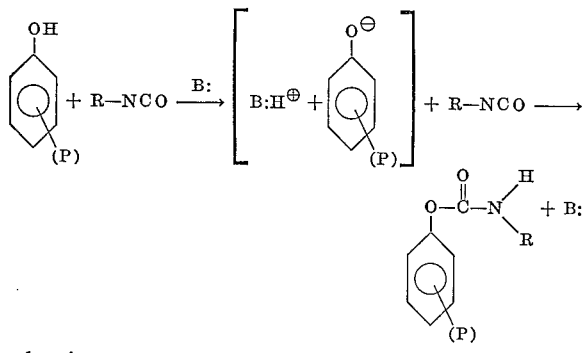

wherein

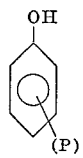

represents the hydroxybenzoic acid capped hydroxy-containing polymer, R represents the remainder of the polyisocyanate components, and B represents the tertiary amine.

A distinct advantage of the present invention over the prior art, in addition to advantage of very rapid curing at room temperature, is the fact that the compositions of this invention can be mixed, while in their liquid state, with the tertiary amine in liquid form for totally liquid application as was briefly mentioned in the discussion of the 2-head spray gun application previously. Once applied in liquid form, the compositions readily cure at room temperature to essentially their ultimate state for use. The compositions of the prior art, as exemplified in U.S. Pat. 3,409,579, cannot be so applied because of their almost instantaneous gellation upon contact with the tertiary amine. The compositions of this invention, while they cure very rapidly relative to the prior art systems, cure slow enough to allow premixing of the liquid tertiary amine with one of the two remaining components and good sprayability as a two component system through a 2-head spray gun. The slight delay in curing allows the entire composition to flow together smoothly on the surface to be sprayed and then readily cure to its ultimate state at room temperature. For these same reasons, brushing and rolling applications are possible.

This invention makes it possible to combine the disclosed components with pigments for use as rapid cure fillers for paneling materials such as chipboard. The filters can be formulated by mixing a filler pigment, such as $CaCO_3$, with the hydroxybenzoic acid capped hydroxy-containing polymer component in a ratio of from 6:1 to 0.1:1. These ingredients are normally blended with a high speed mixer. These pigmented components are then mixed with the polyisocyanate component and applied as fillers to the panel board. Curing is effected by bringing the above ingredients together with a tertiary amine. This invention also makes it possible to pigment the disclosed compositions in a similar manner with paint pigments, such as $TiO_2$, and thus provide a rapid cure general industrial enamel for a variety of uses as primers and final color coatings for wood, metal, etc. Furthermore, this invention makes it possible to provide for rapid cure filling, as discussed above, followed by rapid cure finishing to a high gloss with an unpigmented composition made according to this invention. Thus, this invention makes possible a number of rapid cure laminations according to the teachings of this invention: filling, printing, and high-gloss overcoating. Such pigmented filler or finishing compositions according to this invention cure rapidly to a handleable state, within the period of from about 5 minutes to about 45 minutes.

It is contemplated that the novel compositions and process of the instant invention, generally, will be useful as rapid cure printing inks; for finishing bowling alleys, bowling pins, sports equipment, furniture, insulation, cabinets and paper boxes; as chemical resistant coatings for concrete and jet fuel tanks; as floor and aircraft enamels; as marine paints; as tank linings; as binders for foundry cores; and in the production of factory finish wood products. These potential uses are by no means intended to be exclusive of other uses. Other applications of this invention will become readily apparent to one of ordinary skill in the art.

The examples serve only to illustrate the present invention and are not intended to limit the scope of the invention. All parts and percentages are by weight unless otherwise indicated.

The following examples show the preparation of low molecular weight, phenolic-functional polyesters that can be crosslinked with polyisocyanates in the practice of the present invention.

EXAMPLE I

| Component | Wt. percent |
|---|---|
| Adipic acid (AA) | 13.08 |
| Trimethylol propane (TMP) | 24.00 |
| | 37.08 |
| —Water of esterification | 3.22 |
| | 33.86 |
| Methyl salicylate (MS) | 108.85 |
| Dibutyltin oxide (DBTO) | .72 |
| | 143.43 |
| —Methanol from transesterification | 11.48 |
| | 131.95 |
| —Excess methyl salicylate | 46.95 |
| | 85.00 |
| Cellosolve acetate (CA)—urethan grade | 15.00 |
| | 100.00 |

The AA and TMP are charged into a reactor equipped with an agitator, the thermometer, water trap, and condenser. The charge is slowly heated to a stirrable slurry under a nitrogen blanket. Heating is then continued to 335–340° F. where the water of esterification begins distilling. Continuing heating to 480° F. esterification is continued to an acid value of less than 5. The reactor is cooled to 350° F. and the MS and DBTO are added. After inserting a fractionating column into the apparatus, the reactor is reheated to 365° F. where the methanol from transesterification begins distilling. Heating is continued to about 500° F. to complete the transesterification reaction. The reactor is cooled to 125° F., the water trap and fractionating column are removed, and the apparatus is set up for vacuum distillation. The system is evacuated to about 0.05 mm. Hg gauge pressure and the reactor is reheated to 155 to 160° F. where the excess methyl salicylate begins distilling. Stripping is continued to a maximum temperature of 385° F. At this point 87 percent of the theoretical unreacted methyl salicylate has been removed. The reactor is cooled to about 300° F. and reduced to 85 percent nonvolatile with the CA. The product is used as the hydroxybenzoic acid capped hydroxy-containing polymer component in a capped polymer-polyisocyanate coating system.

EXAMPLE II

| Component | Wt. percent |
|---|---|
| Adipic Acid (AA) | 9.85 |
| Trimethylolpropane (TMP) | 18.08 |
| | 27.93 |
| —water of esterification | 2.43 |
| | 25.50 |
| ε-Caprolactone (CL) | 30.80 |
| Dibutyltin oxide (DBTO) | 0.0562 |
| | 56.3562 |
| Methyl salicylate (MS) | 79.43 |
| Dibutyltin oxide (DBTO) | 0.625 |
| | 136.4112 |
| —Methanol of transesterification | 7.99 |
| | 128.41212 |
| —Excess methyl salicylate | 28.62 |
| | 99.8012 |

After preparing the AA-TMP ester by the method outlined in Example I, the reactor is cooled to 250° F. and the water trap is removed. A premix of the CL and DBTO is added and the reactor is reheated to 300° F. After reacting 5 hours at 300° F. the non-volatile of the mixture has increased to 99+ percent showing essentially complete reaction of the CL. A premix of MS and the second portion of DBTO is added to the reactor. A fractionating column and water trap are inserted into the apparatus and the reactor is heated to about 355° F. where the methanol from the transesterification reaction begins to distill over. Heating is continued to 490° F. The amount of distillate collected shows 94 percent esterification of the available hydroxy groups on the ester. The reactor is cooled to 150° F., the column and water trap are removed, and the apparatus is set up for vacuum distillation. The system is evacuated to about 0.05 mm. Hg gauge pressure, and reheated to 165 to 170° F. where the excess methyl salicylate begins distilling. Stripping is continued to a maximum temperature of 285° F. At this point 74 percent of the theoretical unreacted methyl salicylate has been removed. The reactor is cooled and the product is used as the capped polymer component in a capped polymer-polyisocyanate coating system.

The following examples illustrate the preparation of the hydroxybenzoic acid capped hydroxy-containing polymer-polyisocyanate blends and the properties of films of these blends when cured with triethyl amine (TEA).

EXAMPLE III

A blend having a non-volatile content of about 70 percent was prepared by mixing at room temperature 43.6 grams of the product of Example I and 56.4 grams of Mondur HC polyisocyanate. The polyisocyanate component is a light stable polyisocyanate solution of the following characteristics:

| | |
|---|---|
| Appearance | Clear liquid. |
| Solids Content | 58.5–61.5%. |
| Available NCO | 11.0–11.6%. |
| Color | Gardner 2, Max. |
| Wt. per gallon | 9.3 lb., 77° F. |
| Viscosity | 750–1000 cps., 68° F. |
| Solvents | Cellosolve Acetate:Xylene (25:15). |
| Flash Point: | |
| (Open Cup) | 110° F. |
| (Closed Cup) | 87° F. |
| Avg. Equivalent Wt. | 371. |

Considering only the phenolic hydroxyls of the hydroxybenzoic acid capped polymer, the theoretical hydroxy-to-isocyanate ratio of this blend is one-to-one. If the phenolic hydroxyls of the unreacted methyl salicylate are included, this ratio will be significantly higher. The viscosity of this blend is about 10 stokes. In air, the viscosity doubles in about 3 hours. However, in a nitrogen atmosphere, viscosity stability is at least 24 hours. A 1.5 mil wet film of this blend on a glass panel will pass 500 grams Zapon 2½ minutes after being exposed for 15 seconds to an atmosphere saturated with TEA vapor. The film at this point is hard to the touch and cannot be smeared or rubbed off by handling: Fifteen minutes later, the Sward hardness is 18. This film at this point is hard, durable and able to withstand the handling required for storage and shipping, etc. After 2½ days, the Sward hardness has increased to 32. At this time, the film has good flexibility and it is essentially unaffected when exposed to xylene for 5 minutes. A 1.5 mil wet film on Bonderite 1000, cold rolled steel has a 3H pencil hardness and passes 3T flexibility after 2½ days. This flexibility test is conducted by forming a film of the composition on a thin (approximately 1.5 mm. in thickness) sheet of metal. The metal is folded 180° onto itself. The first fold is 0T, the second 180° fold is 1T, etc. The fold at which the film does not crack is the flexibility number. In this example, 3T flexibility means that the metal has been folded upon itself 4 times and the distance between the film surfaces after the fourth fold is 3 thicknesses of the metal. Thus, the film does not crack when the metal is folded 180° leaving a distance between the fold surfaces of 3 thicknesses of the metal.

EXAMPLE IV

A blend having a non-volatile content of about 80 percent was prepared by mixing at room temperature 49 parts of the product of Example II and 51 parts of Mondur HC polyisocyanate. Considering only the phenolic hydroxyls of the hydroxybenzoic acid capped polymer, the theoretical hydroxy-to-isocyanate ratio of this blend is one-to-one. If the phenolic hydroxyls of the unreacted methyl salicylate are included, this ratio will be significantly higher. The viscosity of this blend is about 12 stokes. In the presence of air, this viscosity doubles in about 2½ hours. However, in a nitrogen atmosphere, the viscosity stability is at least 24 hours. A 1.5 mil wet film of this blend on a glass panel will pass 500 grams Zapon 5½ minutes after being exposed for 15 seconds to an atmosphere saturated with TEA vapors. The film at this point is hard to the touch and cannot be smeared or rubbed off by handling. Ten minutes later the Sward hardness of this film is 10. The film at this point is hard, durable and able to withstand the excessive handling required for storage, shipping, etc. After 24 hours, the Sward hardness has increased to 24, the film has excellent flexibility, but its resistance to chemicals is not quite as good as the product of Example III.

EXAMPLE V

Dibutyltin dichloride, a catalyst for the capped polymer-polyisocyanate reactions, was added to the blend of Example IV at a concentration of 0.2 pph based on the total solids content of the blend. This catalyst was added in the form of a 50 percent solution which is available from Metal and Thermite Corp. under the trade name of T-20. A 1.5 mil wet film of this blend on a glass panel passed 500 grams Zapon 3 minutes after being exposed for 15 seconds to an atmosphere saturated with TEA vapors. This represents about a 45 percent reduction in the time required for the film to become essentially cured. Final film properties and the viscosity stabiltiy of the blend were comparable to those of Example IV, and, thus, not greatly affected by the dibutyltin dichloride.

Having thus described the invention, we claim:

1. A composition capable of being rapidly cured at room temperature with a tertiary amine to essentially its final state, said composition comprising the reaction product of:
   (a) a hydroxybenzoic acid capped hydroxy-containing polymer component, said polymer component comprising the reaction product of:
   (1) a prepolymer material containing free hydroxy groups, and
   (2) up to a stoichiometric amount of a capping compound of the structure

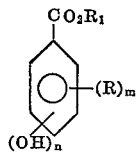

wherein $R_1$ is selected from the group consisting of H and a $C_1$–$C_4$ alkyl group; R is selected from the group consisting of H, a $C_1$–$C_8$ alkyl group, and an aromatic substituent; n+m cannot be greater than 5; and n must be at least 1; and
   (b) a hardener component comprising a polyisocyanate having at least two isocyanate groups in an amount sufficient to cause essentially complete curing of said hydroxybenzoic acid capped component.

2. A composition according to claim 1 wherein said composition is capable, when applied as a coating, of exhibiting about 50 to about 65% of its final film properties 15 minutes or less after exposure to said tertiary amine for about 15 seconds.

3. A composition according to claim 2 wherein said about 50 to about 65% of the final film properties are exhibited within 2–3 minutes.

4. A composition according to claim 2 wherein said exposure to said tertiary amine is accomplished by placing said composition in a saturated atmosphere of said amine.

5. A composition according to claim 1 wherein said composition is capable of forming a substantially colorless coating and said polyisocyanate is one which will not impart undesirable color to the composition.

6. A composition according to claim 1 which also includes a stabilizing agent selected from the group consisting of mineral acids, strong organic acids, and acid halides in an amount up to 3% by weight based upon the non-volatile content of components (a) and (b).

7. A product formed by rapidly curing the composition of claim 1 at room temperature with a tertiary amine.

8. The product of claim 7 wherein said product is a coating which exhibits about 50 to about 65% of its final film properties 15 minutes or less after exposure to said tertiary amine for about 15 seconds.

9. The product of claim 7 wherein said rapid curing is effected by placing the product in a saturated atmosphere of said tertiary amine.

10. The product of claim 7 wherein said product is a coating of good moisture resistance, caustic resistance, weatherability, flexibility and adhesion to a variety of substrates.

11. The composition of claim 1 wherein said capping compound is reacted in an amount of from about 20 to about 100%, based on the number of free hydroxy groups in the said prepolymer material.

12. The composition of claim 1 wherein said prepolymer material containing free hydroxy groups is selected from the group consisting of:
   (a) the reaction product of a polyhydric alcohol and an alkylene oxide,
   (b) the product resulting from the polymerization of a lactone in the presence of a polyhydric alcohol.
   (c) the reaction product of a polyhydric alcohol and a polybasic acid, which acid may optionally contain non-hydroxy-containing monocarboxylic acids, which reaction product contains free hydroxy groups, and
   (d) the reaction product of an excess of polyhydric alcohol and a diisocyanate, which reaction product contains free hydroxy groups.

13. The composition of claim 1 wherein said capping compound has the following structure:

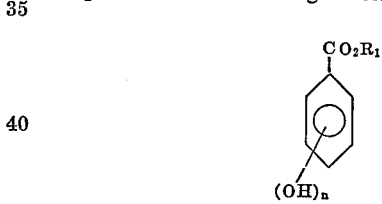

wherein $R_1$ is selected from the group consisting of H, a methyl group, and an ethyl group; n is equal to 1.

14. The composition of claim 1 wherein said hydroxybenzoic acid capped hydroxy-containing polymer component is in the form of an organic solvent solution.

15. The composition of claim 14 wherein said solvent is one in which both said hydroxybenzoic acid capped hydroxy-containing polymer and said polyisocyanate are soluble and wherein said solvent is present in the range of up to 80% by weight of the solution.

16. The process of preparing improved compositions, which process comprises: forming a homogeneous blend of said hydroxybenzoic acid capped hydroxy-containing polymer component and said hardener component of claim 1; spreading or otherwise forming a film of said blend on a substrate; curing in the presence of amine.

17. The process of claim 16 wherein said tertiary amine is in liquid form and wherein said tertiary amine is brought together with said blend by way of admixing said tertiary amine with said hydroxybenzoic acid capped hydroxy-containing polymer component prior to the formation of said homogeneous blend.

18. The process of claim 16 wherein said tertiary amine is in gaseous form.

19. The process of claim 16 wherein said tertiary amine is in gaseous form at room temperature.

20. The process of claim 16 wherein said blend is brought together with said tertiary amine by placing said substrate bearing said film in a saturated atmosphere of said tertiary amine.

21. The process of claim 16 wherein said tertiary amine is suspended in an inert gas stream.

References Cited
UNITED STATES PATENTS

| | | | |
|---|---|---|---|
| 3,265,666 | 8/1966 | Brown et al. | 260—47 |
| 3,476,795 | 11/1969 | Allan | 260—47 |
| 3,222,322 | 12/1965 | Nischk et al. | 260—47 |
| 3,073,802 | 1/1963 | Windemuth et al. | 260—47 |
| 2,692,873 | 10/1954 | Langerak et al. | 260—47 |
| 3,404,018 | 10/1968 | Hicks | 260—47 |

M. J. WELSH, Primary Examiner

E. C. RZUCIDLO, Assistant Examiner

U.S. Cl. X.R.

260—18 TN, 47 CB, 75 TN, 77.5 AM, 77.5 AP

UNITED STATES PATENT OFFICE
CERTIFICATE OF CORRECTION

Patent No. 3,836,491    Dated September 17, 1974

Inventor(s) David D. Taft and Roger A. Schmidt

It is certified that error appears in the above-identified patent and that said Letters Patent are hereby corrected as shown below:

Col. 3, Line 11: Insert "process" after - - novel - -

Col. 3, Line 37 "tertary" should be corrected to - - tertiary - -

Col. 7, Line 59: "polmer" should be corrected to - - polymer - -

Col. 14, Line 60: insert "a tertiary" before - - amine - -

Col. 10, Line 9: "filters" should be corrected to - - fillers - -

Col. 11, Line 71: "285°F" should be corrected to - - 385°F - -

Signed and sealed this 11th day of March 1975.

(SEAL)
Attest:

RUTH C. MASON
Attesting Officer

C. MARSHALL DANN
Commissioner of Patents
and Trademarks